(12) United States Patent
Kidambi

(10) Patent No.: US 7,851,655 B2
(45) Date of Patent: Dec. 14, 2010

(54) FUNCTIONALIZED AMINE-BASED CORROSION INHIBITORS FOR GALVANIZED METAL SURFACES AND METHOD OF USING SAME

(75) Inventor: Srikanth S. Kidambi, Naperville, IL (US)

(73) Assignee: Nalco Company, Naperville, IL (US)

( * ) Notice: Subject to any disclaimer, the term of this patent is extended or adjusted under 35 U.S.C. 154(b) by 205 days.

(21) Appl. No.: 11/612,702

(22) Filed: Dec. 19, 2006

(65) Prior Publication Data

US 2008/0145549 A1    Jun. 19, 2008

(51) Int. Cl.
*C07C 215/12* (2006.01)
*C07C 217/28* (2006.01)
*C02F 5/08* (2006.01)
*C02F 5/12* (2006.01)

(52) U.S. Cl. .................. 564/506; 564/504; 564/505; 564/507; 564/508; 510/247

(58) Field of Classification Search ..................... None
See application file for complete search history.

(56) References Cited

U.S. PATENT DOCUMENTS

| | | | |
|---|---|---|---|
| 3,696,049 | A | 10/1972 | Hausler et al. |
| 5,407,597 | A | 4/1995 | Busch et al. |
| 5,414,123 | A | 5/1995 | Hamilton et al. |
| 6,183,649 | B1 | 2/2001 | Fontana |
| 6,342,295 | B1 | 1/2002 | Kobayashi |
| 6,468,470 | B1 | 10/2002 | Oldsberg et al. |
| 6,818,313 | B2 | 11/2004 | Phelps et al. |
| 7,390,564 | B2 | 6/2008 | Yuasa et al. |

OTHER PUBLICATIONS

Database CAPLUS on STN, Acc. No. 2006:1106115, Xu et al., Macromolecules (2006), 39(23), p. 8178-8185 (abstract).*
"Guidelines for Treatment of Galvanized Cooling Towers to Prevent White Rust," Cooling Tower Institute, CTI Bulletin PFM—142, 1994.
Huntsman Corporation, "The JEFFAMINE™ Polyetheramines," Technical Bulletin, available prior to Dec. 19, 2006.
Huntsman Corporation, "JEFFAMINE™ D-230 Polyetheramines," Technical Bulletin, available prior to Dec. 19, 2006.
Pye, W. A., "Performance Evaluation of Epoxy-Coated Reinforcing Steel and Corrosion Inhibitors in a Simulated Concrete Pore Water Solution," Thesis, Master of Science in Civil Engineering, Virginia Polytechnic Institute and State University, Feb. 14, 1997.
Rajappa, Shanthamma K. and Venkatesha, Thimmappa V., "Inhibition Studies of a Few Organic Compounds and Their Condensation Products on the Corrosion of Zinc in Hydrochloric Acid Medium," Turk J. Chem., vol. 27, pp. 189-196, 2003.
Yurt, A. et al., "Inhibition Efficiency pf Schiff Bases Containing Pyridyl Group as HCL Corrosion Inhibitors for Low Carbon Steel," Advanced Batteries and Accumulators Meeting, 2004.

* cited by examiner

*Primary Examiner*—Brian J Davis
(74) *Attorney, Agent, or Firm*—Edward O. Yonter; Michael B. Martin

(57) ABSTRACT

A composition and method for inhibiting white rust formation on galvanized surfaces. The composition includes hydroxyl-substituted monoamines and polyamines, imino derivatives, and hydroxyamine derivatives. The composition may be introduced onto the galvanized surface, especially in an industrial water system, using a variety of different methods or programs including integrating with current programs or developing a new program.

16 Claims, No Drawings

FUNCTIONALIZED AMINE-BASED CORROSION INHIBITORS FOR GALVANIZED METAL SURFACES AND METHOD OF USING SAME

TECHNICAL FIELD

This invention relates generally to inhibiting corrosion on galvanized metal surfaces. More specifically, the invention relates to a method for inhibiting white rust corrosion on galvanized surfaces. The invention has particular relevance for inhibiting white rust corrosion on galvanized metal surfaces using functionalized amine-based white rust corrosion inhibiting compounds in industrial water systems.

BACKGROUND

Galvanization is a protective zinc coating that is chemically bonded to a metal (usually iron or steel) surface. Zinc coating is used in a variety of applications and offers a certain degree of corrosion protection for the underlying metal by providing a mechanical barrier to the elements and environment as well as electrochemical resistance to corrosion. Several galvanizing methods exist, such as electroplating, continuous galvanization, and hot-dip galvanization. Many industrial water systems, such as cooling water circulation systems (sometimes referred to herein as "cooling towers"), have such galvanized surfaces.

A common problem with galvanized coatings of all kinds is "white rust," which manifests itself as a white, waxy, fluffy, or powdery non-protective and porous deposit that rapidly forms on galvanized surfaces when the surface is exposed to humid and/or wet conditions. White rust can cause considerable damage to the zinc coating and is also detrimental to the coating's appearance. If left unchecked, white rust will continually corrode affected galvanized surfaces and eventually lead to early failure of the coating. With such a non-protective, porous deposit on the galvanized surface, the surface is not "passive" to future white rust formation and may rapidly continue to corrode.

Increased popularity of high alkalinity, no pH control water treatment programs have resulted in more frequent and severe white rust corrosion issues, especially in cooling tower applications. White rust typically forms if a new cooling tower is operated with water at a pH greater than 8.0 for an extended period before a "basic zinc carbonate" protective barrier forms. To ensure long service life, the galvanized surfaces in cooling towers typically must be allowed to "passivate" or form a protective barrier prior to initial operation or start-up. Proper water treatment and start-up procedures are also essential. One way to passivate the surfaces is to allow the zinc coating to develop a natural nonporous surface of basic zinc carbonate during initial start-up of the cooling tower. This natural chemical barrier helps prevent or slow further rapid corrosion of the zinc coating from the environment as well as from normal cooling tower operation.

This basic zinc carbonate barrier, believed to be a zinc carbonate/zinc hydroxide compound (as discussed in "Guidelines for Treatment of Galvanized Cooling Towers to Prevent White Rust," published by the Cooling Tower Institute in June 1994) typically forms within eight weeks of initial cooling tower operation with water of neutral pH (i.e., pH 6.5 to 8.0) and moderately hard water environment. A typical solute content range would be calcium ($CaCO_3$) content of 100 ppm to 300 ppm as bicarbonate alkalinity and about 100 ppm $CaCO_3$ hardness. Formation of the protective zinc carbonate barrier is important for the cooling tower to resist further corrosion. Barrier absence could result in severe white rust formation and have a significant negative impact on the cooling tower's service life.

White rust is also a form of zinc carbonate that has a different porous structure, rate of formation, and density than the protective zinc carbonate barrier described above. If the water hardness levels, measured by $CaCO_3$ hardness, reach levels below 50 ppm (i.e., soft water), accelerated zinc corrosion generally results. Certain ionic content in the water, such as sulfates, chlorides, and nitrates at levels greater than about 250 ppm may also contribute to accelerated zinc corrosion. Thus, routine inspection of the cooling tower coupled with adequate control of the water chemistry aids in the prevention of white rust formation.

Current white rust corrosion prevention programs include a combination of pre-passivating the cooling tower combined with ongoing water chemistry management to support the viability of the passivation layer. In addition to the basic zinc carbonate protective layers, as described above, white rust preventatives include pretreatment with inorganic phosphate and chromate passivation. Such inorganic solutions have limited effectiveness and are steadfastly becoming the object of federal and local regulations due to environmental concerns.

Other solutions for white rust prevention include using selective thiocarbamates, organo-phosphorous compounds, and tannins to passivate the surface. For example, U.S. Pat. No. 5,407,597 provides a formulation including a mixture of an organophosphorous compound, a thiocarbamate compound, and soluble metal salt compound. The components of this formulation are used as a combination and the ingredients tested alone typically do not control white rust formation. The formulation in U.S. Pat. No. 6,468,470 B1 includes a multi-component system of an organophosphorous compound, a tannin compound, and a soluble salt of a metal.

Moreover, under normal operating conditions, cooling towers have substantial evaporative water loss. As a result, large quantities of "make-up" water are introduced into the system that commonly contains ionic species, such as calcium, magnesium, sulphate, and chloride. Increased alkalinity (e.g., carbonate, bicarbonate, and hydroxide ions) may also cause white rust corrosion. Particularly, accumulation of carbonate alkalinity, with a concomitant pH increase, creates an ideal white rust-forming environment. This accumulation is one of the major causes of white rust. The presence of excess anions and/or soft water can aggravate the degree of white rust formation by, for example, reacting with the zinc coating to produce zinc hydroxide.

As an integral component of cooling water circulation systems biocides are essential is preventing algal, bacterial, and fungal contamination of the systems. Some of these biocides sometimes promote white rust formation as a byproduct because they chemically react with certain white rust inhibitors and/or with the zinc coating. For example, sodium hypochlorite (i.e., bleach) is a common biocide and is highly reactive.

Because high pH levels are also contributing factor to white rust formation, the addition of a sufficient quantity of free acid, commonly sulfuric acid, to the cooling water helps preclude the formation of white rust. Such free acid addition creates concerns for those handling the free acid and also creates potential for metal corrosion from the acid itself due to overfeed or spillage. None of these passivation or maintenance procedures described above provides a complete solution to the white rust problem. There thus exists a need to provide efficient and improved compositions and methods of inhibiting white rust corrosion.

SUMMARY

Accordingly, this invention provides novel amine-based white rust corrosion-inhibiting compounds capable of significantly inhibiting white rust formation in industrial water systems having galvanized metal surfaces. The compounds include those of the formula $[R]_2N—R1_x—N[R]_2$. It includes H, mono-hydroxylated alkyl groups, or poly-hydroxylated alkyl groups. R1 includes $—[CH_2CH_2—N(R2)—CH_2CH_2]$, oxypropylene, oxyethylene, polyether, the like, or combinations thereof. R2 includes H, alkyl groups, alkylated carboxylates, alkylated sulfonates, mono-hydroxylated alkyl groups, or poly-hydroxylated alkyl groups. X is from 1 to about 20.

The method of the invention includes introducing an effective amount of a corrosion-inhibiting composition having an amine-based white rust corrosion-inhibiting compound onto the galvanized metal surface to form a barrier on the surface. In one embodiment, the method further includes overlaying the barrier by reintroducing an effective amount of the corrosion-inhibiting composition onto the galvanized metal surface after one or more time intervals.

In an embodiment, the invention provides a method of inhibiting corrosion in an industrial water system, such as a cooling tower, that is at least partially full of water and has one or more galvanized metal surfaces. The method includes adjusting the water in the industrial water system to have a pH from about 6.5 to about 8.2 and introducing an effective amount of a corrosion-inhibiting composition that includes one or more amine-based white rust corrosion-inhibiting compounds into the water of the industrial water system.

Implementing the method may be accomplished when the system is either under load or not under load. If the system is not under load when introducing the corrosion-inhibiting composition, the water in the system is circulated after such introduction for a time interval to contact the amine-based white rust corrosion-inhibiting compound with the galvanized metal surfaces of the system to form the barrier on those surfaces. After a sufficient interval, the unloaded system may be turned on or brought under load at any suitable time. If the system is under load when introducing the corrosion-inhibiting composition, the system is operated under load after such introduction for a time interval to contact the amine-based white rust corrosion-inhibiting compound with the galvanized metal surfaces of the system and form the barrier on those surfaces.

In an aspect, the invention provides a method for overlaying the barrier formed by the amine-based white rust-inhibiting compound. This aspect includes overlaying the barrier while the system is under load or not under load. If the barrier is overlaid while the system is under load, the method includes readjusting the pH of the system to be from about 6.5 to about 8.2 and reintroducing an effective amount of the corrosion-inhibiting composition into the water of the system. The system is then operated under load for one or more additional time intervals and the barrier is optionally re-overlaid after one or more of the additional time intervals.

If the barrier is overlaid while the system is not under load, the method includes readjusting the pH of the system to be from about 6.5 to about 8.2, reintroducing an effective amount of the corrosion-inhibiting composition into the water of the system, and circulating the water of the system for a sufficient interval to contact the amine-based white rust-inhibiting compound with the surfaces. After the sufficient interval, the unloaded system may be turned on or brought under load at any suitable time.

Though the invention is particularly relevant to applications such as basins and heat transfer coils of cooling towers, it should be appreciated that the implementation of the method is not limited to such cooling tower applications. Contemplated applications include any system having galvanized metal surfaces. The invention may also be combined with one or more other corrosion or scale inhibiting compositions, such as silicates, borates, molybdates, tungstates, chromate, zinc salts, orthorphosphate, polyphosphate, phosphonates/phosphinates, combinations thereof, or any other suitable corrosion or scale inhibiting compound or composition, with or without one or more fluorescent tracer compounds. Such combinations would form a comprehensive corrosion and scale inhibition program, discussed in more detail below.

An advantage of the invention is to provide a method of inhibiting corrosion, especially white rust corrosion, on galvanized metal surfaces.

Another advantage of the invention is to extend the lifespan of galvanized metal surfaces in various applications including industrial water systems.

It is another advantage of the invention to provide novel amine-based white rust corrosion-inhibiting compositions for galvanized surfaces.

Yet another advantage of the invention is to provide a one-step passivation method for inhibiting white rust corrosion on galvanized surfaces of industrial water systems.

An additional advantage of the invention is to provide a method for initially pre-passivating with a white rust corrosion-inhibiting composition and post-treating by overlaying the white rust corrosion-inhibiting composition on galvanized surfaces.

A further advantage of the invention is to provide a white rust corrosion-inhibitive composition that does not react with biocides used in industrial water systems.

It is another advantage of the invention to provide an approach to inhibiting white rust corrosion on galvanized surfaces in industrial water systems that is effective under a range of pH conditions.

It is a further advantage of the invention to provide an approach to inhibiting white rust corrosion on galvanized surfaces in industrial water systems that is effective with water having low ionic content, such as soft water.

It is yet another advantage of the invention to provide a method for inhibiting white rust corrosion on galvanized surfaces in industrial water systems that is effective under elevated carbonate alkalinity.

It is still another advantage of the invention to provide a composition and method for inhibiting white rust corrosion on galvanized surfaces in industrial water systems, which includes one or more amine-based compounds that adsorb and/or bind to the surfaces and which are effective under a range of pH conditions, a range of alkalinity levels, and a range of water hardness levels.

DETAILED DESCRIPTION

The amine-based white rust corrosion-inhibiting compound of the invention, in one embodiment, is a hydroxylated alkoxyamine. In a preferred embodiment, the compound is formed from a polyoxypropylene diamine. In another preferred embodiment, the compound is of the formula $[CH(OH)CH(OH)CH_2]_2N—[CH(CH_3)CH_2O]_x—N[CH_2CH(OH)CH(OH)]_2$. X is from 1 to about 20. In this embodiment, the amine groups of the compound are fully hydroxyl-functionalized.

In alternative embodiments, the amine-based white rust-inhibiting compound includes one or more of $[R]_2N—[R1]_x—N[R]_2$ and $[R]_2N—[CH\ CH_2—N(R2)—CH_2CH_2]_x—N$

[R]$_2$. R includes mono-hydroxylated alkyl groups or poly-hydroxylated alkyl groups. R1 includes oxyethylene, polyether, or combinations thereof. R2 includes H, alkyl groups, alkylated carboxylates, alkylated sulfonates, mono-hydroxylated alkyl groups, or poly-hydroxylated alkyl groups X is from 1 to about 20. In one embodiment the alkyl groups are branched or unbranched $C_1$ to $C_6$. Alkyl as used herein means a monovalent group derived from a straight or branched saturated chain hydrocarbon by the removal of a single hydrogen atom. Representative alkyl groups include methyl, ethyl, n- and iso-propyl, cetyl, and the like.

In another embodiment, the amine-based white rust corrosion-inhibiting compound is a reaction product of $H_2N$—[R3]$_Y$—$NH_2$ and chloropropanediol, glycidol, or epichlorohydrin. In this embodiment, R3 includes [—$CH_2CH_2$—N(R4)—$CH_2CH_2$], oxypropylene, oxyethylene, polyether, or combinations thereof. R4 includes H, alkyl groups, alkylated carboxylates, alkylated sulfonates, mono-hydroxylated alkyl groups, or poly-hydroxylated alkyl groups. Y is from 1 to about 20. In one embodiment, the alkyl groups are branched or unbranched $C_1$ to $C_6$. In a further embodiment, an amine derivative is reacted with a dicarboxylic acid, such as oxalic acid or adipic acid, to form the white rust corrosion-inhibiting compound.

In a further embodiment, the white rust corrosion-inhibiting compound is an imino derivative or a hydroxyamine derivative reaction product of an aldehyde or a ketone with a monoamine or a polyamine. In another embodiment, the compound is an imino derivative or a hydroxyamine derivative reaction product of an aldehyde or a ketone with a polyether monoamine or a polyether polyamine. For example, reaction of glyoxylic acid with diglycolamine at elevated temperature (e.g., 40° C. to 80° C.) for a sufficient time to promote a dehydration reaction. Acid catalyst, such as sulfuric acid, may also be used.

An exemplary method of preparing the amine-based white rust corrosion-inhibiting compound is to react Jeffamine® D230 (available from Huntsman, Salt Lake City, Utah), which is characterized by repeating oxypropylene units in the backbone and has the chemical formula $H_2N$—$(CH(CH_3)CH_2O)_Z$—$CH_2CH(CH_3)NH_2$, with glycidol(2,3-epoxy-1-propanol). Jeffamine® D230 is a difunctional, primary amine with an average molecular weight of about 230 grams per mole. Z is typically from about 1 to about 20 repeating units. Preferably, Z is from 1 to 3, and most preferably, Z is 2. The reaction takes place at room temperature or at a slightly elevated temperature. Reaction products of the above reaction include 1,4 (quad-); 1,3 (tri-); and 1,2 (di-) substituted diamines. In a preferred embodiment, the reaction product of the above reaction is primarily 1,4 quad-substituted hydroxylated polyalkoxyamine.

It should be appreciated that the white rust-inhibiting compounds described herein can each be used independently, simultaneously, sequentially, alternating between different compounds, or by implementing in any suitable order or fashion.

The invention also provides a method of inhibiting corrosion on a galvanized metal surface. The method includes introducing an effective amount of a corrosion-inhibiting composition onto the galvanized metal surface to form a barrier on the surface. The term "barrier" as used herein includes surface modification of the galvanized surface, change of morphology of the galvanized surface, chemical interaction of any of the white rust corrosion-inhibiting compounds with the galvanized surface, or any other similar modification of or interaction with the surface. In one embodiment, an effective amount of the corrosion-inhibiting composition includes from about 0.001 weight percent to about 100 weight percent of the white rust corrosion-inhibiting compound. In a preferred embodiment, an effective amount of the composition includes from about 0.001 weight percent to about 50 weight percent of the compound. In a more preferred embodiment, from about 0.1 weight percent of to about 30 weight percent of the compound of the composition is introduced to the galvanized surface.

Representative amine-based white rust-inhibiting compounds include substituted amines, such as mono-substituted monoamines, mono-substituted polyamines, poly-substituted monoamines, poly-substituted polyamines, mono-substituted polyether monoamines, mono-substituted polyether polyamines, poly-substituted polyether monoamines, poly-substituted polyether polyamines. These substituted amines include one or more hydroxyl groups. It is further contemplated that other amine-based compounds may be utilized in the method of the invention, such as imino derivatives, hydroxyamine derivatives, and combination thereof. Preferred compounds include diethyl triamine, diglyciol amine, Jeffamine® derivatives, and the like.

In one aspect, introducing the corrosion-inhibiting composition onto the galvanized surface includes incorporating the method into a hot dip manufacturing process. For example, the metal would first be dipped in melted zinc at 450° C. (temperature at which iron/steel and zinc share great affinity) where the metal would be protected with a zinc coating. The next step in the manufacturing process would be to dip the zinc-coated metal into the corrosion-inhibiting composition including the amine-based white rust corrosion-inhibiting compound.

In another aspect, such introduction includes spraying a solution of the composition directly onto the surface, including surfaces in industrial water systems. In one embodiment, the composition is mixed with a foaming agent to form a mixture and the mixture is subsequently sprayed onto the galvanized metal surface using any suitable spraying device. Foaming agents may include surfactants, such as alkoxylated alcohols, polyethylene glycol, or any other suitable surfactant. In alternative embodiments, the composition may be physically applied onto the surface by rolling using a paint roller or the like, brushing using a paintbrush or the like, swabbing using a mop or the like, or by using any other suitable method or technique.

In another aspect, the corrosion-inhibiting composition is reintroduced onto the surface one or more times after one or more time intervals to "overlay" the barrier or "re-passivate" the surface. Ongoing overlaying steps to renew the corrosion-inhibitory barrier and/or to re-passivate the galvanized surfaces are also contemplated. As determined on a case-by-case basis, the method may include a plurality of different corrosion-inhibiting compositions and overlaying the barrier may include introducing a different one or more of the corrosion-inhibiting compositions onto the galvanized metal surface(s).

In one embodiment, an effective amount of the corrosion-inhibiting composition is introduced into the water of a cooling water circulation system (sometimes referred to herein as "cooling tower") to form a barrier on (or passivate) any galvanized metal surfaces of the system. It should be appreciated that such introduction may be into a new, unused system prior to initial operation of the system or into a running, operational system. The corrosion-inhibiting composition of the invention may be introduced into any industrial water system as either an adjunct treatment in combination with other compositions or programs, such as scale and/or corrosion-inhibiting programs, or as a stand-alone treatment program, as described in more detail herein.

The industrial water system is at least partially full of water and has one or more galvanized metal surfaces. The method includes adjusting the water in the system to have a pH from about 6.5 to about 8.2. In a preferred embodiment, the pH of the water in the system is adjusted to be from about 6.8 to about 7.8. The method further includes introducing an effective amount of a corrosion-inhibiting composition that includes one or more amine-based white rust corrosion-inhibiting compounds into the water of the industrial water system.

The corrosion-inhibiting composition typically includes from about 1 ppm to about 10,000 ppm of the white rust corrosion-inhibiting compound. In a preferred embodiment, the composition includes from about 1 ppm to about 1000 ppm of the compound. In a more preferred embodiment, the composition includes from about 1 ppm to about 100 ppm of the compound.

In one embodiment, an effective amount of the corrosion-inhibiting composition is introduced into the water of the industrial water system when the system is operating and under load. In this embodiment, during and after introducing the composition into the system, the system is operated under load (i.e., turned on) for a time interval to contact the amine-based white rust corrosion-inhibiting compound with the galvanized surface(s) in the system to form a barrier on the surface(s).

Certain cases may require overlaying the barrier. Such overlaying may be implemented when the industrial water system is operating and under load or when the system has been turned off and thus not under load. In one embodiment, overlaying the barrier includes unloading (i.e., turning of) the system, readjusting the pH of the system, reintroducing an effective amount of the corrosion-inhibiting composition into the water of the system, and circulating the water of the system. In another embodiment, overlaying the barrier includes keeping the system under load, readjusting the pH of the system (as described above) and reintroducing an effective amount of the corrosion-inhibiting composition into the water of the system.

In an embodiment, the method includes a plurality of different corrosion-inhibiting compositions and overlaying the barrier includes introducing a different one or more of the corrosion-inhibiting compositions into the industrial water system.

It should be appreciated that the corrosion-inhibiting composition of the invention is preferably introduced in a pre-passivation process prior to initially starting up the industrial water system. This method is preferred because such application typically provides the highest degree of passivation and protection for the galvanized surfaces in the system. Alternatively, the corrosion-inhibiting composition may be introduced to a currently operating or running system. As described above, such an application may be implemented without turning off the system by leaving the system under load during the passivation process or by turning off and unloading the system.

Although not required to implement this invention, it is contemplated that the corrosion-inhibiting composition may be combined with one or more other corrosion inhibitors, one or more scale inhibitors, one or more fluorescent tracers, one or more water treatment polymers, one or more polyalkoxy compounds, or any other suitable adjunct or additional component. Any such adjuncts may be part of an existing corrosion-inhibitive program to which the invention becomes an additional component or program. Adjuncts may be part of the corrosion-inhibiting composition or may be another separate composition or compositions. In alternative embodiments, such adjuncts may be added simultaneously or sequentially with the corrosion-inhibiting composition of the invention.

Exemplary other corrosion and scale inhibitors include tungstate; molybdate; vanadate; phosphate; phosphonate; phosphinate; silicate; borate; zinc and its salts; polycarboxylates; benzoic acid; the like; combinations thereof; or any other suitable corrosion or scale inhibitors. Exemplary water treatment polymers include polyacrylic acid; polymaleic acid; copolymers and terpolymers of acrylic acid, maleic acid, acrylamide, and acrylamidopropyl sulfonate; prism polymers; sulfonate-based polymers; and terpolymers or copolymers of acrylic acid, acrylamide, sulfomethylated acrylamide, the like, and combinations thereof.

EXAMPLES

The foregoing may be better understood by reference to the following examples, which are intended to be illustrative and are not intended to limit the scope of the invention.

Example I

In this example, a white rust-corrosion inhibiting compound includes reaction products of Jeffamine® D230 Polyetheramine (as described above) and glycidol. 11.8 grams of the polyetheramine (i.e., polyoxypropylene diamine) was dissolved in 25 grams of water. 15.8 grams of glycidol was slowly added to the solution. The final weight was adjusted to 60 grams and the solution was stirred for several hours at room temperature. Alternatively, the temperature may be adjusted up to about 40° C. The degree of functionalization of the polyoxypropylene diamine varied between one and four, based on the starting concentration (molar ratio) of glycidol and the diamine.

Example II

A dihydroxy functionalized derivative of polyetheramine may be synthesized by reacting 1 mole of polyetheramine (as described in Example I) with different (1 to 4 moles, with 4 moles being the preferred option) moles of 3-chloropropane diol in the presence of 1 to 4 moles of sodium hydroxide at a temperature between about 30° C. and about 80° C. for several hours under constant stirring. This molar ratio will result in a mixture having substituted diamine product with different degree of substitution ranging from one to four.

Example III

Galvanized mild steel metal coupons were exposed in a 10 liter cell (at 40° C.) to the following synthetic water chemistry made using calcium chloride dihydrate, magnesium sulfate heptahydrate, sodium bicarbonate, and sodium carbonate (based on calculated values): $Ca^{2+}$: 400 to 440 ppm (as $CaCO_3$); $Mg^{2+}$: 200 to 220 ppm (as $CaCO_3$); M-Alkalinity: 300 to 340 ppm (as $CaCO_3$); $Cl^-$: 280 to 315 ppm (as $Cl^-$); $(SO_4)^{2-}$: 192 to 211 ppm (as $(SO_4)^{2-}$); and pH controlled using $NaHCO_3/Na_2CO_3$ buffer at pH 8.9. Controls and Samples included a phosphonate-based scale inhibitor program. The Controls had no additional white rust corrosion inhibitor, Both Samples A and B included about 10 ppm hydroxy-functionalized polyalkoxyamine as the white rust corrosion inhibitor. Corrosion rates were based on coupon weight after 7 days of exposure and are expressed in mils per year ("mpy"), as shown in Table I.

TABLE I

| Treatment | mpy |
|---|---|
| Control - A | 11.7 |
| Control - B | 8.4 |
| Sample - A | 3.2 |
| Sample - B | 4.3 |

Example IV

Linear polarization electrochemical experiments were performed in a 10 liter cell using galvanized metal surfaces of hot-dipped galvanized ("HDUG") rotating electrodes (pH-controlled at pH 7.5). The control and sample included a passivation step with 100 ppm of a phosphonate, phosphate, and polymer-based multi-functional water treatment program. The following synthetic water chemistry including calcium chloride dihydrate, magnesium sulfate heptahydrate, and sodium bicarbonate (based on calculated values) was used: $Ca^{2+}$: 150 to 170 ppm (as $CaCO_3$); $Mg^{2+}$: 75 to 85 ppm (as $CaCO_3$); M-Alkalinity: 85 to 105 ppm (as $CaCO_3$); $Cl^-$: 105 to 120 ppm (as $Cl^-$); and $(SO_4)^{2-}$: 72 to 82 ppm (as $(SO_4)^{2-}$). The control and sample also included a second step, where the passivated electrodes were exposed to a more extreme corrosive environment, as in Example III above. Initial corrosion rate (from 0 to 24 hours) followed by a longer duration corrosion rate (24 to 72 hours) were measured in mpy. Table II describes the initial and longer duration corrosion rates.

TABLE II

| Treatment | 0 to 24 hour mpy | 24 to 72 hour mpy |
|---|---|---|
| Control<br>No white rust inhibitor<br>Post-treatment with 100 ppm<br>treatment program as above | 3 to 8 | 3 to 4 |
| Sample<br>Post-treatment in 100 ppm<br>treatment program as above<br>combined with 10 ppm white<br>rust inhibitor (described in<br>Example I) | ~2 to 4.5 | ~1 to 2 |

It should be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. An amine-based white rust corrosion-inhibiting composition of the formula: $[R]_2N-R1_x-N[R]_2$; wherein each R group is H or $-[CH_2-CH(OH)-CH_2(OH)]$; no more than one R group is H and either 3 or 4 of the R groups are $-[CH_2-CH(OH)-CH_2(OH)]$; R1 is oxypropylene; and X is from 1 to about 20.

2. The amine-based white rust corrosion-inhibiting composition of claim 1, wherein reacting $H_2N-[R1]_x-NH_2$ with chloropropanediol, glycidol, or epichlorohydrin forms said composition.

3. A method of inhibiting corrosion on a galvanized metal surface, said method comprising:
   (a) introducing an effective amount of the amine-based white rust corrosion-inhibiting composition of claim 1 onto the galvanized metal surface to form a barrier on said surface; and
   (b) after one or more time intervals, optionally overlaying the barrier by reintroducing an effective amount of the composition onto the galvanized metal surface.

4. The method of claim 3, wherein the galvanized metal surface is part of an industrial water system.

5. The method of claim 3, including preparing a solution of the corrosion-inhibiting composition including from about 0.001 weight percent to about 100 weight percent of the amine-based white rust corrosion-inhibiting compound.

6. The method of claim 3, including spraying, rolling, brushing, and/or swabbing an effective amount of said composition directly onto the galvanized metal surface.

7. The method of claim 3, including dipping the galvanized metal surface into a solution containing the corrosion-inhibiting composition.

8. The method of claim 3, including mixing a foaming agent with the corrosion-inhibiting composition to form a mixture and spraying an effective amount of the mixture onto the galvanized metal surface to form the barrier.

9. The method of claim 3, including a plurality of the amine-based white rust corrosion-inhibiting compositions and repeating step (b) after one or more of the time intervals by introducing a different one of the amine-based white rust corrosion-inhibiting compositions onto the galvanized surface.

10. A method of inhibiting corrosion in an industrial water system that is at least partially full of water and has one or more galvanized metal surfaces, said method comprising:
   (a) adjusting the water in the industrial water system to have a pH from about 6.5 to about 8.2;
   (b) introducing an effective amount of the amine-based white rust corrosion-inhibiting composition of claim 1 into the water of the industrial water system when said system is either under load or not under load;
   (c) circulating the water of the industrial water system for a time interval to contact the amine-based white rust corrosion-inhibiting compound with the galvanized metal surface to form a barrier on the galvanized metal surface, if the system was not under load;
   (d) operating the system for the time interval to contact the white rust corrosion-inhibiting compound with the galvanized metal surface to form the barrier on the galvanized metal surface, if the system was under load;
   (e) optionally overlaying the barrier by:
      i) unloading the system, readjusting the pH of the water in the system to be from about 6.5 to about 8.2, reintroducing an effective amount of the corrosion-inhibiting composition into the water of said system, and circulating the water of the system, or
      ii) keeping the system under load, readjusting the pH of the water in the system to be from about 6.5 to about 8.2 and reintroducing an effective amount of the corrosion-inhibiting composition into the water of said system; and (f) operating the industrial water system under load for one or more additional time intervals and optionally repeating step (e) after one or more of the additional time intervals.

11. The method of claim 10, wherein the industrial water system is a cooling water circulation system.

12. The method of claim 10, including adjusting the pH of the water in the industrial water system to be from about 6.8 to about 7.8.

13. The method of claim 10, wherein the corrosion-inhibiting composition includes one or more compounds selected from the group consisting of: other corrosion inhibitors, scale inhibitors, fluorescent tracers, and water treatment polymers.

14. The method of claim 10, including adding one or more other corrosion or scale inhibiting compositions that include one or more corrosion or scale inhibiting compounds with or without one or more fluorescent tracer compounds either simultaneously or sequentially with the corrosion-inhibiting composition.

15. The method of claim 10, wherein the corrosion-inhibiting composition includes one or more other corrosion inhibitors selected from the group consisting of: phosphates; phosphonates; phosphinates; silicates; molybdate; tungstate; borate; zinc and its salts; vanadate; chromate; polycarboxylates; and combinations thereof.

16. The method of claim 10, including adding one or more water treatment polymers either simultaneously or sequentially with the corrosion-inhibiting composition, said polymer selected from the group consisting of: polyacrylic acid; polymaleic acid; copolymers and terpolymers of acrylic acid, maleic acid, acrylamide, and acrylamidopropyl sulfonate; prism polymers; sulfonate-based polymers; and terpolymers or copolymers of acrylic acid, acrylamide, and sulfomethylated acrylamide.

* * * * *